United States Patent
Shintani et al.

(10) Patent No.: US 10,916,159 B2
(45) Date of Patent: Feb. 9, 2021

(54) SPEECH TRANSLATION AND RECOGNITION FOR THE DEAF

(71) Applicant: Sony Corporation, Tokyo (JP)

(72) Inventors: Peter Shintani, San Diego, CA (US); Brant Candelore, Escondido, CA (US); Mahyar Nejat, San Diego, CA (US); Robert Noel Blanchard, Escondido, CA (US); Hoda Sayyadinejad, San Diego, CA (US)

(73) Assignee: Sony Corporation, Tokyo (JP)

( * ) Notice: Subject to any disclaimer, the term of this patent is extended or adjusted under 35 U.S.C. 154(b) by 331 days.

(21) Appl. No.: 15/995,735

(22) Filed: Jun. 1, 2018

(65) Prior Publication Data

US 2019/0371202 A1    Dec. 5, 2019

(51) Int. Cl.
| | | |
|---|---|---|
| *G09B 21/04* | (2006.01) | |
| *G10L 13/08* | (2013.01) | |
| *G10L 15/08* | (2006.01) | |
| *G02B 27/01* | (2006.01) | |
| *G10L 15/26* | (2006.01) | |

(52) U.S. Cl.
CPC ........... *G09B 21/04* (2013.01); *G02B 27/017* (2013.01); *G10L 13/08* (2013.01); *G10L 15/08* (2013.01); *G10L 15/26* (2013.01); *G02B 2027/0178* (2013.01); *G10L 2015/088* (2013.01)

(58) Field of Classification Search
CPC ...... G09B 21/04; G09B 21/00; G09B 21/006; G09B 21/0003; G09B 21/009; G02B 27/017; G02B 2027/0178; G10L 13/08; G10L 15/265; G10L 2015/088

See application file for complete search history.

(56) References Cited

U.S. PATENT DOCUMENTS

| | | |
|---|---|---|
| 5,146,502 A | 9/1992 | Davis |
| 6,594,346 B2 | 7/2003 | Engelke |
| 6,795,807 B1 | 9/2004 | Baraff |
| 7,676,372 B1 | 3/2010 | Oba |
| 7,747,434 B2 | 6/2010 | Flanagan et al. |
| 2017/0243582 A1 | 8/2017 | Menezes et al. |

FOREIGN PATENT DOCUMENTS

CN    106686223 A    5/2017

OTHER PUBLICATIONS

"ORCAM", retrieved from https://www.orcam.com/en/.
"Tap Systems—Wearable Keyboard, Mouse & Controller", Tap Systems, Retrieved from https://www.tapwithus.com/.
Aira, "Aira Service", retrieved from https://aira.io/.
ESight, "Glasses that Let the Visually Impaired See", Retrieved from https://www.esighteyewear.com/.
Jeffrey P. Bigham, Raja Kushalnagar, Ting-Hao Kenneth Huang, Juan Pablo Flores, Saiph Savage, "On How Deaf People Might Use Speech to Control Devices", ASSETS '17 Oct. 29-Nov. 1, 2017, Baltimore, MD, USA.

(Continued)

*Primary Examiner* — Timothy A Musselman
(74) *Attorney, Agent, or Firm* — John L. Rogitz

(57) ABSTRACT

An application on a mobile phone or tablet computer or eyeglasses listens to the speech of a profoundly deaf person and interprets it in real time. It can then repeat it in a "normal voice". The voice recognition is trained to the voice of the profoundly deaf person.

17 Claims, 4 Drawing Sheets

(56) References Cited

OTHER PUBLICATIONS

Thibault Duchemin, "Ava: Group Conversations Made Accessible", Indigegeo.
Peter Shintani, Brant Candelore, Mahyar Nejat, Robert Noel Blanchard, "Duplicate Speech to Text Display for the Deaf", file history of related U.S. Appl. No. 15/995,927, filed Jun. 1, 2018.
Shintani et al., "Duplicate Speech to Text Display for the Deaf", related U.S. Appl. No. 15/995,927, Applicant's response to Non-Final Office Action filed Jul. 1, 2020.
Shintani et al., "Duplicate Speech to Text Display for the Deaf", related U.S. Appl. No. 15/995,927, Non-Final Office Action dated Jun. 26, 2020.

SPEECH TRANSLATION AND RECOGNITION FOR THE DEAF

FIELD

The present application relates to technically inventive, non-routine solutions that are necessarily rooted in computer technology and that produce concrete technical improvements.

BACKGROUND

Severely hearing impaired and profoundly deaf people cannot hear themselves speak and so they are unable to approximate sounds typically found in "normal" speech. This poses problems for conversations since the listener has difficulty comprehending what is being said by the hearing-impaired speaker. The speech of the hearing impaired can be almost unintelligible even though the speaker is trying to properly articulate sound. Likewise, the normal-hearing conversational partner is difficult for the hearing-impaired person to understand.

Sign language offers a solution but unfortunately very few people understand it. Furthermore, sign language consists of a limited vocabulary that consequently can limit expression. Lip reading also offers a solution but is often inaccurate and moreover cannot be used when the speaker is not facing the deaf person.

SUMMARY

Present principles recognize the above problems and so provide an assembly with a housing. At least one processor is in the housing, and at least one display is supported on the housing and is configured to communicate with the processor. At least one computer storage also is in the housing and includes instructions executable by the processor to receive speech comprising at least one distortion caused by a speech impediment. The instructions are executable to execute speech recognition on the speech to render an output, and to present the output as text on a display. Also, the instructions can be executed to receive at least one correction to the text to render corrected text. The instructions are executable to convert the corrected text to speech signals and then play the speech signals on at least one speaker.

In example embodiments, the housing is configured as eyeglasses. In other implementations the housing is a housing of a mobile phone or tablet computer. In some examples the correction is voice-input. In other examples the correction is input from a key entry device. In other examples the correction is input by non-key entry taps on a surface.

In another aspect, a system includes at least one computer storage that is not a transitory signal and that includes instructions executable by at least one processor to receive first speech in a first language from a person with a speech impediment. The instructions can be executed to execute word recognition on the speech to generate output and to present the output on at least one display as text. The instructions also are executable to receive input from the person with a speech impediment to change the text, change the text according to the input to render modified text, and convert the modified text to sound signals in the first language. The instructions are executable to play the sound signals on at least one speaker.

In another aspect, a method includes receiving speech in a first language from a person with a speech impediment. The method includes converting the speech to text, receiving corrections to the text to render a correction, and outputting speech in the first language corresponding to the correction.

The details of the present disclosure, both as to its structure and operation, can be best understood in reference to the accompanying drawings, in which like reference numerals refer to like parts, and in which:

DETAILED DESCRIPTION

Figure 1:
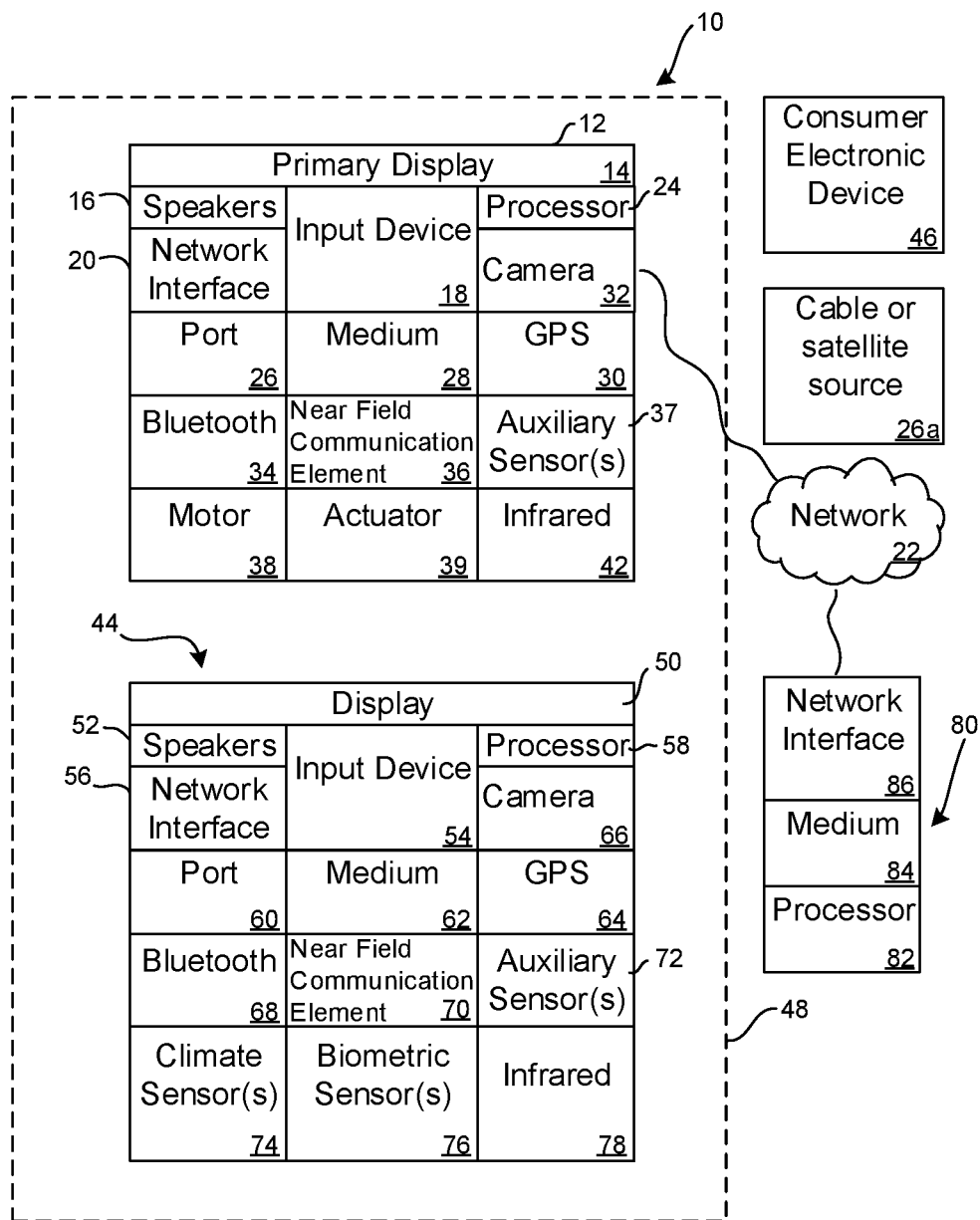
FIG. 1 is a block diagram of an example system including an example in consistent with present principles.

This disclosure relates generally to computer ecosystems including aspects of consumer electronics (CE) device-based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A. B. C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The first CE device 44 may be embodied in the form of eyeglasses. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
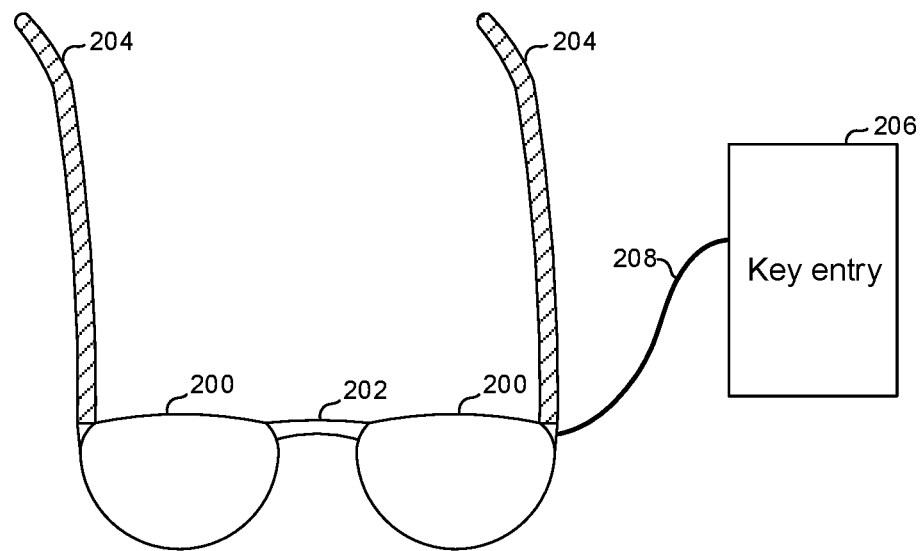
FIG. 2 is a perspective view of present principles embodied as "smart" eyeglasses.

FIG. 2 shows an example embodiment 200 of the translation module consistent with present principles embodied as eyeglasses. The embodiment 200 may incorporate appropriate components shown and described above in reference to FIG. 1, e.g., some or all of the components of the CE device 44.

The eyeglasses typically have left and right transparent eyeglass lenses 200 connected by a nose bridge 202 configured for resting on a person's nose. Left and right temples 204 extend rearwardly from the outer edge of each eyeglass lens 200 as shown and are configured for resting against the temples of a person typically in engagement with the ears. A key entry device 206 such as a mobile phone or tablet computer or other suitable device may be connected to the processor in the embodiment 200 via, e.g., a path 208 that may be a wired USB path or a wireless Bluetooth path or other desired communication path for purposes to be shortly disclosed.

Figure 3:
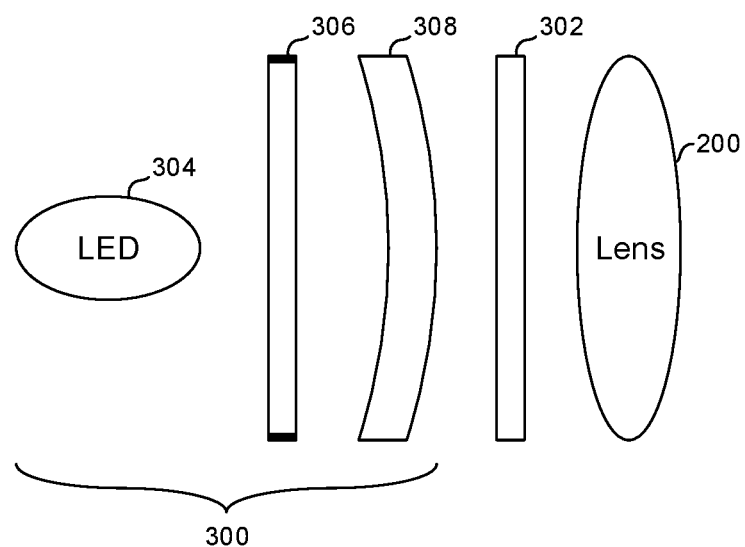
FIG. 3 is a schematic view of example optical elements of the glasses in FIG. 2.

FIG. 3 illustrates an example optical component train for one of the lenses 200 shown in FIG. 2, it being understood that both lenses 200 may be associated with respective optical component trains. The example eyeglass embodiment may be equipped with a thin, lightweight display module designed for transparent lens glasses. The module includes an optical engine 300 that projects images and text using micro display (μDisplay) technology, and a holographic waveguide 302 embodied as an extremely thin transparent plate of glass with a thickness of one millimeter. The waveguide 302 receives the light created in the optical engine 300 and projects a virtual image through the holographic optical elements to the eyes of the wearer. Together with protective plating, this technology enables more than 85% outside light transmittance, with lenses that are only about three millimeters thick in total.

The optical engine 300 may include a light source 304 such as a light emitting diode (LED), a microdisplay 306, and a projection lens 308.

The eyeglass embodiment in FIGS. 2 and 3 is a binocular, see-through (more than 85% transmittance) system with an example field of view of Diagonal 20° (19°×6°), a virtual screen size of 2.7 m×0.8 m (106⅜ in×31½ in) (horizontal× vertical), a virtual viewing distance of approximately eight meters, a maximum brightness of 1,000 cd/m2, a resolution of 419×138 pixels (horizontal×vertical), a display color of monochrome (green), and an eight bit grayscale.

Additionally, the eyeglasses 200 may incorporate any of the appropriate components of the first CE device 44 in FIG. 1. Accordingly, the eyeglasses 200 may include a camera that can take still images of, e.g., three MP, produce video such as JPEG video with or without sound (QVGA equivalent resolution). An audio speaker may be included with a processor such as a microcontroller in the glasses. Communication transceivers may be provided such as BLUETOOTH, Wi-Fi, and Micro universal serial bus (USB) ports. The eyeglasses may include a microphone and various sensors including an accelerometer, a gyroscope, an electronic compass, a brightness sensor, and a noise suppression sub microphone. The eyeglasses 200 may include a power supply such as built-in lithium-ion rechargeable battery with a maximum charge current of 0.9 amperes and a maximum charge voltage of 4.25 volts (DC). The processor of the eyeglasses may execute an Android operating system. The eyeglasses may be supplied to end users along with a carrying case, a dark filter, a camera cover sheet, and a nose pad.

Figure 4:
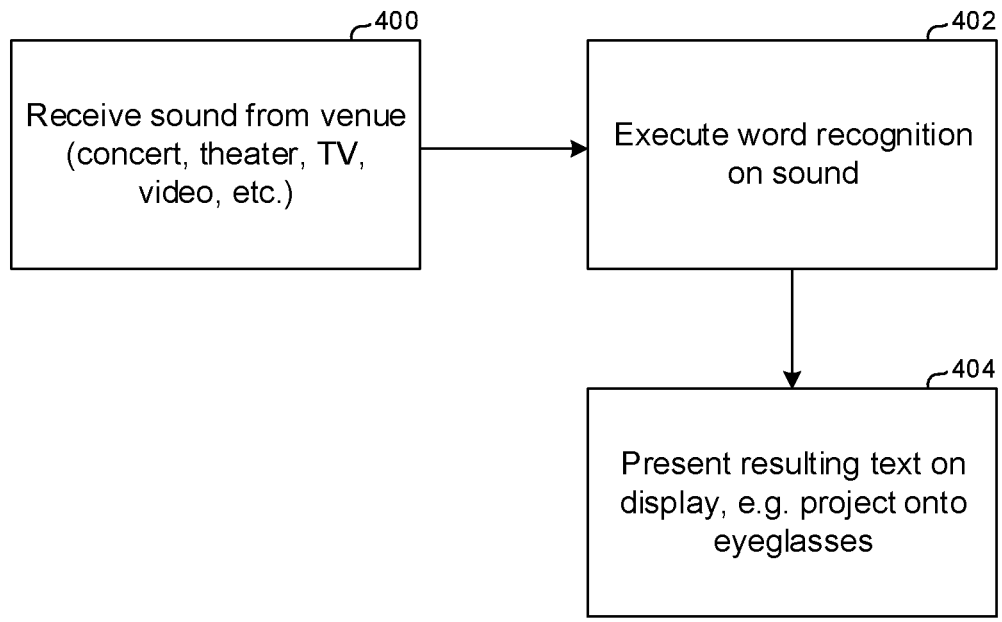
FIGS. 4-6 are flow charts of example logic consistent with present principles.

FIG. 4 illustrates example logic consistent with present principles. Commencing at block 400, sound is received. The sound may be received from a venue such as a concert hall, a theater, or from a device such as a TV, a video player, etc. Proceeding to block 402, word recognition is executed on the sound received at block 400. Moving to block 404, the words produced by the operation at block 402 are presented as text on a display. In an example, the text is produced by projecting it onto the lens structures of FIG. 2, although other displays may be used. In this way, a deaf person viewing the display on which the text is presented can read the text and thus understand any lyrics or words from the sound venue or device in pseudo-real time (i.e., typically within a few milliseconds of the sound being detected, depending on processing speed).

Figure 5:
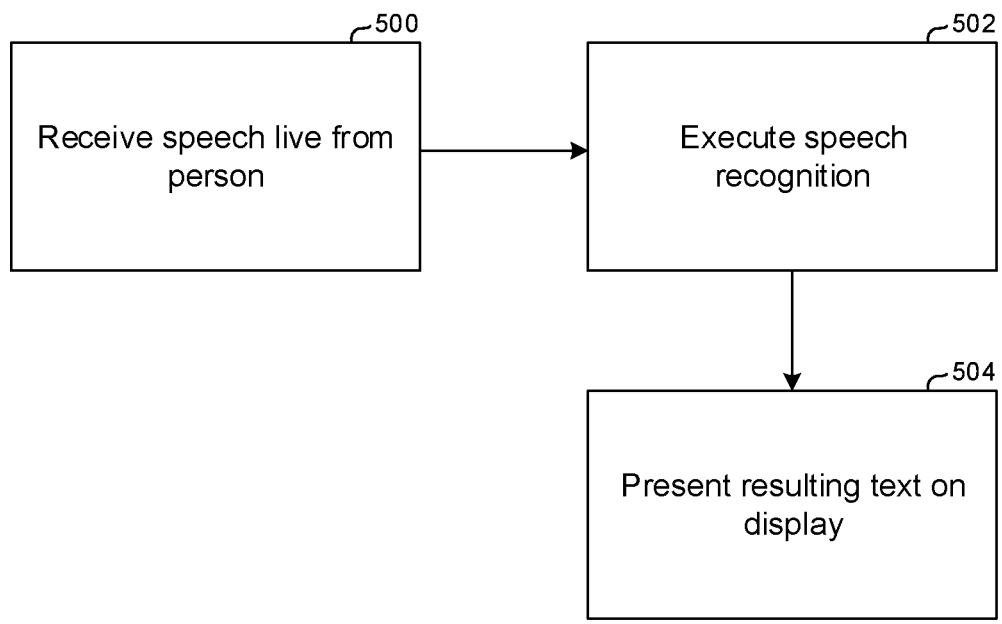

FIG. 5 illustrates additional example logic consistent with present principles. Commencing at block 500, sound is received. The sound may be received from real time speech spoken by a person into, e.g., a microphone worn on a lapel of the person or otherwise disposed near the mouth of the person, or the microphone of the display on which text is presented to the deaf person. Proceeding to block 502, word recognition is executed on the sound received at block 500. Moving to block 504, the words produced by the operation at block 502 are presented as text on a display. In an example, the text is produced by projecting it onto the lens structures of FIG. 2, although other displays may be used. In this way, a deaf person viewing the display on which the text is presented can read the text and thus understand words from the speaking person in pseudo-real time (i.e., typically within a few milliseconds of the sound being detected, depending on processing speed).

Figure 6:
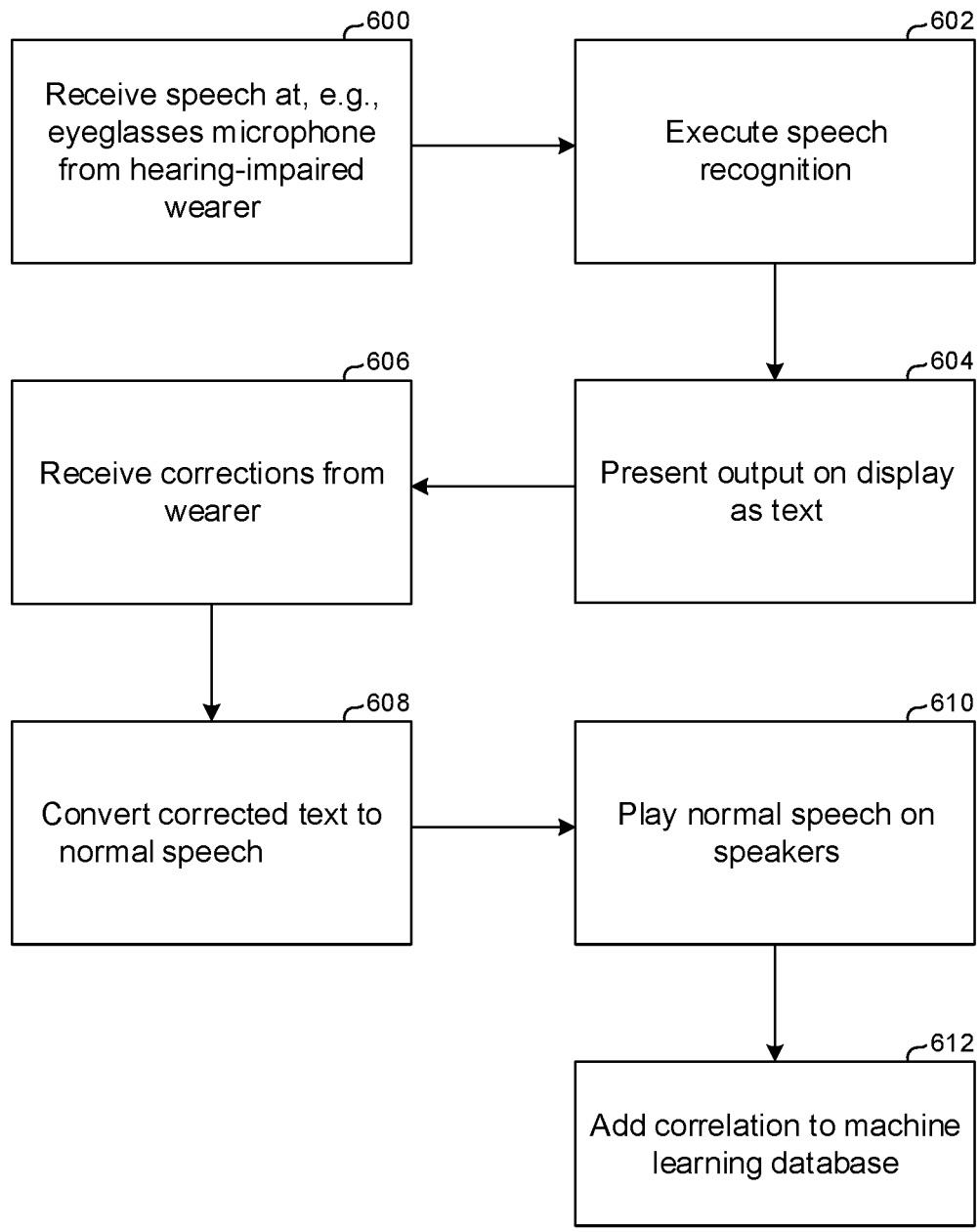

FIG. 6 illustrates additional example logic consistent with present principles. Commencing at block 600, speech is received from a hearing-impaired speaker. The speaker may be profoundly deaf and thus may have a speech impediment that makes the speaker difficult to understand. The speech may be received, e.g., at a small microphone on the eyeglasses 200 shown in FIG. 2 implementing components of, e.g., the CE device 44 of FIG. 1. Or, the text may be received from a CE device such as the CE device 44 or 46 embodied by a mobile phone and disposed near the deaf person who is speaking, e.g., as by being clamped to a scuba-like mask. The mobile phone may perform voice-to-text conversion and send the text via a short range wireless protocol such as Bluetooth or via another type of communication path such as a universal serial bus (USB) path to the display for presentation thereof.

Moving to block 602, speech recognition is executed on the speech received at block 600. The voice signals may be sent from a processor communicating with the capturing microphone to an Internet server which performs voice-to-text conversion and returns the output for display. The capturing microphone may be on a mobile phone. As mentioned above, the mobile phone itself may execute the voice-to-text conversion. The output can be presented as text on a display such as any of the displays divulged herein, including the eyeglasses 200 that may be worn by the hearing-impaired speaker whose speech is being digitized and recognized.

If the speech impediment of the speaker is sufficiently bad, it may be difficult for the word recognition engine executed by, e.g., the processor in the eyeglasses 200 to correctly output the text of the word(s) intended by the speaker. Accordingly, the text output at block 604 may contain errors. With this in mind, corrections to the text may be received at block 606. The corrections may be received by means of the hearing-impaired speaker inputting corrections using the key entry device 206, or by speech recognition input from the speaker who may attempt to better articulate misspelled words in the presented text, or by a technique of taps by the (hearing-impaired) speaker on, e.g., the eyeglasses 200 which, recall, may include on or more motion sensors that can sense taps, for example, taps on the bridge 202.

In an example, suppose three words output from block 602 are presented on the display at block 604. A single tap may indicate the first word, a double tap the second, and a triple tap the third. Multiple taps may be identified by having been received within a usually short time period of each other, e.g., within one-half second of each other.

In this way, the word desired to be corrected may be identified, and a screen cursor located over the first letter of the corresponding word on the display. Then, should the correcting person desire to change that letter, he may either tap a code such as Morse code representing the desired letter, or some other code such as, in quick succession, the number of taps corresponding to the numeric location in the alphabet of the correct (replacement) letter. Once this input has been received, by waiting for a timeout period, e.g., two to three seconds, the screen cursor may move to the second letter in the word to permit correction of that letter as well, and so on through the word. Tap patterns may be correlated to insertion and deletion commands to permit inserting a letter or deleting a letter from the display text.

Once corrections to the displayed text have been completed, the logic may move to block 608 to convert the corrected text to speech signals. Moving to block 610, the speech signals are then played in "normal" language on speakers. In an example, the speakers may be on the eyeglasses 200 or a computing device such as a mobile phone communicating therewith via, e.g., Bluetooth. At block 612, the initial distorted speech received at block 600 is correlated to the corrected speech from block 606 in a data structure that may be accessed by a machine learning algorithm, so that subsequent utterances by the speaker of the same sounds will automatically be correlated to the "corrected" words.

In this way, a hearing-impaired person can train his or her device, whether implemented as eyeglasses or another device such as a mobile phone or tablet computer, to learn the speech of the person and how to translate it into "normal" speech in the same language. Thus, speech interpretation can be implemented of what the hearing-impaired person says and repeated live in "normal" language in pseudo-real time as the hearing-impaired person talks. The person's utterances are interpreted as described and displayed as text to the deaf speaker and then re-spoken in "normal" language to others.

Accordingly, a severely hearing-impaired person can train a speech recognition engine for his particular voice using as many words as possible. This could be treated as a type of language requiring translation or heavily accented English in which the spoken phrase is shown on a display, e.g., on the eyeglasses 200 so that the deaf person can verify the phrase if need be and make edits to it using voice commands or a portable keyboard or taps. If the text presented is acceptable, then the text is converted to a spoken phrase that is played in normal accents. Alternatively, instead of speaking a hearing-impaired person can type text and have it spoken out loud on the speakers.

While particular techniques are herein shown and described in detail, it is to be understood that the subject matter which is encompassed by the present application is limited only by the claims.

What is claimed is:

1. An assembly, comprising:
   a housing configured as a head-mounted device;
   at least one processor in the housing;
   at least one display supported on the housing and configured to communicate with the processor;
   the processor being programmed with instructions executable by the processor to:
   receive speech comprising at least one distortion caused by a speech impediment;
   execute speech recognition on the speech to render an output;
   present the output as text on a display;
   receive at least one correction to the text to render corrected text;
   convert the corrected text to speech signals;
   play the speech signals on at least one speaker.

2. The assembly of claim 1, wherein the housing is configured as eyeglasses.

3. The assembly of claim 1, wherein the correction is voice-input.

4. The assembly of claim 1, wherein the correction is input from a key entry device.

5. The assembly of claim 1, wherein the correction is input by non-key entry taps on a surface.

6. The assembly of claim 1, wherein the housing is a mobile phone or tablet computer housing.

7. A system comprising:
   at least one processor configured with instructions to:
   receive first speech in a first language from a person with a speech impediment;
   execute word recognition on the speech to generate output;
   present the output on at least one display as text;
   receive input from the person with a speech impediment to change the text;
   change the text according to the input to render modified text;
   convert the modified text to sound signals in the first language; and
   play the sound signals on at least one speaker; and
   at least one frame configured as a head-wearable device and supporting the display and processor.

8. The system of claim 7, comprising the at least one display.

9. The system of claim 7, wherein the frame is configured as eyeglasses and supports the display and processor.

10. The system of claim 7, wherein the input is voice input.

11. The system of claim 7, wherein the input is touch input on a display or a keypad or keyboard.

12. The system of claim 7, wherein the input comprises taps sensed by at least one motion sensor.

13. A method comprising:
    receiving speech in a first language from a person with a speech impediment;
    converting the speech to text;
    receiving corrections to the text to render a correction; and
    outputting speech in the first language corresponding to the correction, wherein the method is implemented by at least one processor in a device configured as eyeglasses.

14. The method of claim 13, wherein the method is implemented by at least one processor in a tablet computer or mobile phone.

15. The method of claim 13, comprising presenting the text on at least one display visible by the person.

16. The method of claim 13, wherein the corrections comprise input from a key input device.

17. The method of claim 13, wherein the corrections comprise taps on a surface.

* * * * *